United States Patent [19]
Shiratori et al.

[11] Patent Number: 5,149,601
[45] Date of Patent: Sep. 22, 1992

[54] SOLID OXIDE FUEL CELL

[75] Inventors: Akira Shiratori, Nagaokakyo; Shozo Kobayashi, Takatsuki; Hiroshi Takagi, Otsu; Yukio Sakabe, Kyoto, all of Japan

[73] Assignee: Murata Manufacturing Co., Ltd., Kyoto, Japan

[21] Appl. No.: 710,444

[22] Filed: Jun. 5, 1991

[30] Foreign Application Priority Data

Jun. 6, 1990 [JP] Japan .................. 2-149644

[51] Int. Cl.⁵ ............................. H01M 8/10
[52] U.S. Cl. ........................... 429/30; 429/32; 429/39
[58] Field of Search ............ 429/32, 30, 12, 38, 429/39, 34

[56] References Cited

U.S. PATENT DOCUMENTS

| | | | |
|---|---|---|---|
| 3,012,086 | 12/1961 | Vahldieck | 429/30 |
| 3,526,549 | 9/1970 | Archer et al. | |
| 3,554,808 | 1/1971 | Fischer et al. | 429/32 |
| 3,717,506 | 2/1973 | Hopkins | 429/32 |
| 4,629,537 | 12/1986 | Hsu | 429/32 X |
| 4,769,298 | 9/1988 | Hosaka | 429/34 |

FOREIGN PATENT DOCUMENTS

| | | |
|---|---|---|
| 361383 | 4/1990 | European Pat. Off. . |
| 395975 | 11/1990 | European Pat. Off. . |
| 4016157 | 12/1990 | Fed. Rep. of Germany . |
| 63-274062 | 3/1989 | Japan . |
| 1197972 | 11/1989 | Japan . |
| 1197498 | 7/1970 | United Kingdom . |

OTHER PUBLICATIONS

Dokiya et al., "Overview of Planar SOFC Development at NCLI", *Proceedings of the First International Symposium on Solid Oxide Fuel Cells*, vol. 89-11, pp. iii, 325-336 (Jul. 1989).

Dokiya et al., "Fabrication of a Planar Solid Oxide Fuel Cell", *Proceedings of the 24th Intersociety Energy Conversion Engineering Conference*, vol. 3, pp. 1547-1551 (Aug. 1989).

*Primary Examiner*—Anthony Skapars
*Attorney, Agent, or Firm*—Burns, Doane, Swecker & Mathis

[57] ABSTRACT

Disclosed is a solid oxide fuel cell of a laminate structure. A solid electrolyte having a fuel side electrode and an air side electrode on either side and conductive distributors are arranged one upon another so as to form a cell in the shape of a disk. Further, thus made cells are connected via interconnectors so as to form a solid oxide fuel cell of a laminate structure.

20 Claims, 3 Drawing Sheets

PRIOR ART

SOLID OXIDE FUEL CELL

BACKGROUND OF THE INVENTION

1. Field of the Invention

The present invention relates to a solid oxide fuel cell.

2. Description of Related Art

FIG. 5 shows a conventional solid oxide fuel cell. The solid oxide fuel cell comprises a porous ceramic cylinder 30, and around the ceramic cylinder 30 are formed an air side electrode 31, a solid electrolyte 32 and a fuel side electrode 33.

The solid oxide fuel cell has a problem that the area of effective electrodes per a unit volume is small, which results in low efficiency in generation of electrical energy.

SUMMARY OF THE INVENTION

An object of the present invention is to provide a solid oxide fuel which has a stable structure and high efficiency in generation of electrical energy.

In order to attain the object, a solid oxide fuel cell according to the present invention comprises a solid electrolyte having a fuel side electrode and an air side electrode on its upper and lower sides respectively; and conductive distributors connected with the fuel side electrode and the air side electrode of the solid electrolyte respectively; wherein the solid electrolyte and the distributors are arranged one upon another to form a disk-like cell, and the disk-like cells are connected via interconnectors to form a laminate structure.

Since the solid electrolyte having the fuel side electrode and the air side electrode, and the distributors can be made thin, a thin disk-like cell can be obtained. Accordingly the area of effective electrodes per a unit volume of the solid oxide fuel cell containing such thin disk-like cells becomes large.

Further, in the solid oxide fuel cell of the laminate structure, the disk-like cells and the interconnectors have through holes at their edge portions to form a gas passage extending in a direction of the thickness of the disk-like cells, and the gas passage and the distributors form a manifold. In the structure, the manifold, through which a gas is supplied to the fuel side electrode or the air side electrode, can be made compact. As a gas supplied to the fuel side electrode, hydrogen, hydrocarbon or the like is used. As a gas supplied to the air side electrode, air, oxygen or the like is used.

BRIEF DESCRIPTION OF THE DRAWINGS

This and other objects and features of the present invention will become apparent from the following description taken in conjunction with the preferred embodiment thereof with reference to the accompanying drawings, in which.

DETAILED DESCRIPTION OF THE PREFERRED EMBODIMENT

Figure 1:
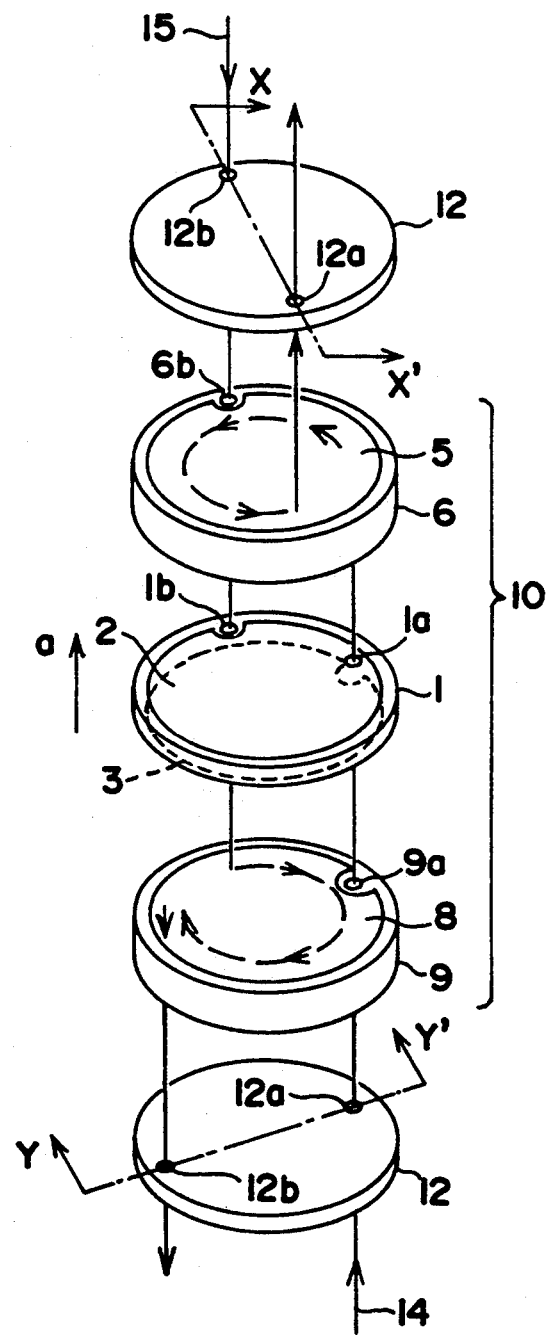
FIG. 1 is an exploded perspective view of a disk-like cell contained in a solid oxide fuel cell of an embodiment.

The following describes an exemplary solid oxide fuel cell according to the present invention, referring to the drawings.

Figure 2:
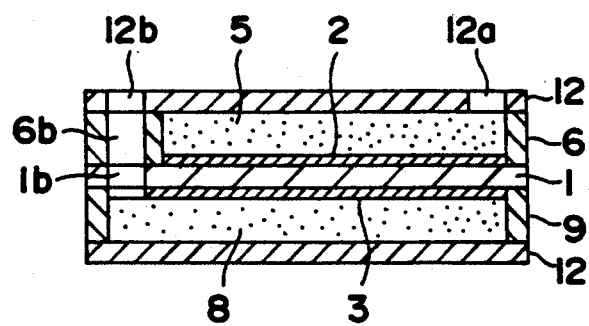
FIG. 2 is a sectional view of the disk-like cell crossed along the line X—X' indicated in FIG. 1.
Figure 3:
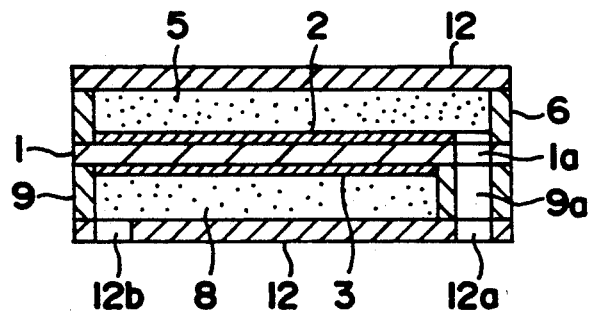
FIG. 3 is a sectional view of the disk-like cell crossed along the line Y—Y' indicated in FIG. 1.

Referring to FIGS. 1 through 3, a disk-like solid electrolyte 1 has a through hole 1a which is a part of a fuel gas passage and a through hole 1b which is a part of an air passage at its edge portion. The solid electrolyte 1 is made of stabilized zirconia or the like. A fuel side electrode 2 is disposed on the upper side of the solid electrolyte 1 so as not to cover the edge portion and the through hole 1b but to cover the through hole 1a. An air side electrode 3 is disposed on the lower side of the solid electrolyte 1 so as not to cover the edge portion and the through hole 1a but to cover the through hole 1b. The fuel side electrode 2 and the air side electrode 3 are made of, for example, a Ni.YSZ cermet material and a conductive oxide material respectively. The materials in a state of paste are coated on the upper and lower sides of the solid electrolyte 1 and printed thereon.

A disk-like distributor 5, which is provided with a spacer 6 on the circumference, is connected with the fuel side electrode 2. A disk-like distributor 8, which is provided with a spacer 9 on the circumference, is connected with the air side electrode 3.

The distributors 5 and 8, which are made of a conductive porous material, are to distribute a fuel gas and air respectively to the fuel side electrode 2 and the air side electrode 3 entirely and evenly. The spacers 6 and 9, which are made of an insulating material, shield the distributors 5 and 8 from outside air. The spacer 6 has a through hole 6b which is to communicate with the air through hole 1b of the solid electrolyte 1. The spacer 9 has a through hole 9a which is to communicate with the fuel gas through hole 1a of the solid electrolyte 1.

The solid electrolyte 1 and the distributors 5 and 8 are joined together so that the solid electrolyte 1 is between the distributors 5 and 8, and thus a disk-like cell 10 is made. In this embodiment, further, interconnectors 12 are provided on the upper and lower sides of the disk-like cell 10. Each of the interconnectors 12 has a fuel gas through hole 12a and an air through hole 12b on its edge portion so that the through holes 12a and 12b are opposite each other. The interconnectors 12 are joined to the cell 10 so that the through hole 12b of the upper interconnector 12 communicates with the air through hole 6b of the spacer 6 and that the through hole 12a of the lower interconnector 12 communicates with the fuel gas through hole 9a of the spacer 9.

In this manner, the disk-like cell 10 is provided with the interconnectors 12 on the upper and lower sides.

The following describes the operation of the cell 10 of this structure. A fuel gas 14 flows upward to the distributor 5 through the through hole 12a of the lower interconnector 12, the through hole 9a of the spacer 9 and the through hole 1a of the solid electrolyte 1. The distributor 5 distributes the fuel gas 14 to the fuel side electrode 2 evenly.

Air 15 flows downward to the distributor 8 through the through hole 12b of the upper interconnector 12, the through hole 6a of the spacer 6 and the through hole 1b of the solid electrolyte 1, and the distributor 8 distributes the air 15 to the air side electrode 3 evenly. The temperature inside the cell 10 is maintained high (600–1,200° C.), and the air 15 distributed to the air side electrode 3 and the fuel gas 14 distributed to the fuel side electrode 2 react to each other via the solid electrolyte 1, that is, an electrode reaction occurs, which causes an electric current to flow in a direction of the thickness of the cell 10 (direction indicated by arrow a in FIG. 1). The electric current flows through the distributor 5, and flows outward through the upper interconnector 12. The fuel gas 14 after the electrode reaction is exhausted from the through hole 12a of the upper interconnector 12, and the air 15 after the electrode reaction is exhausted from the through hole 12b of the lower interconnector 12.

Figure 4:
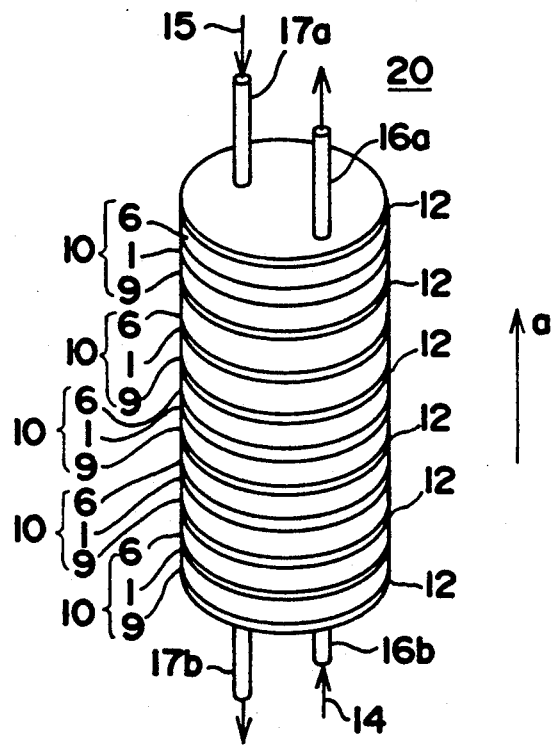
FIG. 4 is a perspective view of the solid oxide fuel cell containing the disk-like cells as shown in FIG. 1.
Figure 5:
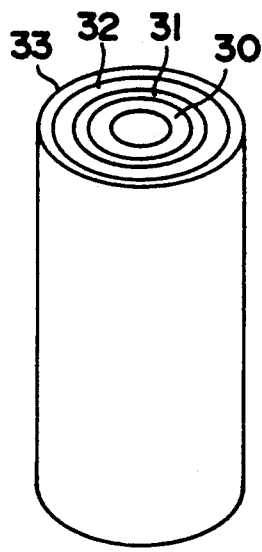
FIG. 5 is a perspective view of a conventional solid oxide fuel cell.

FIG. 4 shows a solid oxide fuel cell 20 containing five cells 10 of the above-described type in series. Fuel gas pipes 16a and 16b are connected with the fuel gas through holes of the upper and lower interconnectors 12, and air pipes 17a and 17b are connected with the air through holes of the upper and lower interconnectors 12. The fuel gas through holes of the cells 10 communicates with each other to form a fuel gas passage, and further the fuel gas passage and the fuel side distributors of the cells 10 compose a fuel gas manifold in the solid oxide fuel cell 20. Likewise, the air through holes of the cells 10 communicates with each other to form an air passage, and further the air passage and the air side distributors of the cells 10 compose an air manifold in the solid oxide fuel cell 20.

The fuel gas 14 flows from the gas pipe 16b upward through the fuel gas passage, and the air 15 flows from the air pipe 17a downward through the air passage. Alternatively, the solid oxide fuel cell 20 can be so made that the air 15 flows from the air pipe 17b upward through the air passage. The temperature in the solid oxide fuel cell 20 is maintained high, and the fuel gas 14 and the air 15 react to each other via the solid electrolytes 1 of the cells 10, which causes an electric current to flow in a direction indicated by arrow a in FIG. 4. The electric current flows upward through the interconnector 12 disposed on the upper side of the solid oxide fuel cell 20.

Since the disk-like cell 10 can be made thin, the solid oxide fuel cell 20 can be made compact. Accordingly the area of effective electrodes per a unit volume of the solid oxide fuel cell 20 is large, compared with conventional solid oxide fuel cells, and the solid oxide fuel cell 20 is more efficient in generation of electrical energy. Further, since the solid oxide fuel cell 20 is a cylindrical laminate structure attained by arranging the disk-like components one upon another, thermal stress is easy to be released therefrom. Therefore the solid oxide fuel cell 20 is reliable.

Although the present invention has been described in connection with the embodiment above, it is to be noted that various changes and modifications are apparent to those who are skilled in the art. Such changes and modifications are to be understood as included in the appended claims.

Although the solid oxide fuel cell obtains the highest efficiency in generation of electrical energy when the air side electrodes 2 and the fuel side electrodes 3 of the cells 10 are round, the electrodes 2 and 3 can be made in any other shapes like rectangles.

What is claimed is:

1. A solid oxide fuel cell including a plurality of cells, each of the cells comprising:
    a solid electrolyte having a fuel side electrode and an air side electrode on upper and lower side thereof, respectively; and
    a fuel side conductive distributor connected with the fuel side electrode and an air side conductive distributor connected with the air side electrode of the solid electrolyte, the conductive distributors comprising porous material capable of distributing air and fuel gas evenly to the air side electrode and the fuel side electrode, respectively;
    wherein the solid electrolyte and the distributors are arranged one upon another and the cells are connected via interconnectors to form a laminate structure.

2. A solid oxide fuel cell as claimed in claim 1, wherein the cells and the interconnectors have through holes at their edge portions to form a gas passage extending in a direction of the thickness of the cells, and the gas passage and the distributors form a manifold.

3. A solid oxide fuel cell comprising:
    a plurality of disk-like cells; and
    a plurality of interconnectors each of which has a fuel gas through hole and an air through hole in its periphery portion;
    wherein each of the disk-like cells comprises:
    (a) a disk-like solid electrolyte which has a fuel side electrode on one surface and an air side electrode on the other surface and has a fuel gas through hole and an air through hole in its periphery portion;
    (b) a disk-like air distributor which is made of a conductive porous material and is disposed on the air side electrode of the solid electrolyte;
    (c) a first spacer which is disposed around the air distributor and has a fuel gas through hole communicating with the fuel gas through hole formed on the solid electrolyte;
    (d) a disk-like fuel gas distributor which is made of a conductive porous material and is disposed on the fuel side electrode of the solid electrolyte; and
    (e) a second spacer which is disposed around the fuel gas distributor and has an air through hole communicating with the air through hole formed on the solid electrolyte;
    the disk-like cells are laminated to each other with the interconnectors therebetween such that the through holes and the distributors form a fuel gas passage and an air passage extending in a direction of the thickness of the disk-like cells.

4. The solid oxide fuel cell as claimed in claim 1, wherein the conductive distributors are surrounded by spacers of insulating material which shield the conductive distributors from outside air.

5. The solid oxide fuel cell as claimed in claim 4, wherein one surface of the air side conductive distributor is in contact with the air side electrode and an opposite surface of the air side conductive distributor is in contact with one of the interconnectors.

6. The solid oxide fuel cell as claimed in claim 5, wherein one surface of the fuel side conductive distributor is in contact with the fuel side electrode and an opposite surface of the fuel side conductive distributor is in contact with one of the interconnectors.

7. The solid oxide fuel cell as claimed in claim 4, wherein each of the spacers includes only one through hole therein for passage of gas to and from a respective one of the conductive distributors.

8. The solid oxide fuel cell as claimed in claim 6, wherein each of the spacers includes only one through hole therein for passage of gas to and from a respective one of the conductive distributors.

9. The solid oxide fuel cell as claimed in claim 2, wherein the conductive distributors are surrounded by spacers of insulating material which shield the conductive distributors from outside air.

10. The solid oxide fuel cell as claimed in claim 9, wherein each of the spacers includes only one through hole therein for passage of gas to and from a respective one of the conductive distributors.

11. The solid oxide fuel cell as claimed in claim 1, wherein each of the distributors has a thickness greater than a total thickness of the electrolyte, the air side electrode and the fuel gas electrode.

12. The solid oxide fuel cell as claimed in claim 1, wherein the electrolyte comprises stabilized zirconia.

13. The solid oxide fuel cell as claimed in claim 1, wherein the electrolyte includes an air passage and a fuel gas passage passing through the upper and lower sides of the electrolyte, the fuel side electrode being arranged so as to cover the fuel gas passage but not cover the air passage, the air side electrode being arranged so as to cover the air passage but not cover the fuel gas passage, the fuel side distributor being arranged so as to cover the fuel side electrode but not cover the air passage and the air side distributor being arranged so as to cover the air side electrode but not cover the fuel gas passage.

14. The solid oxide fuel cell as claimed in claim 13, further comprising a fuel side spacer surrounding the fuel side distributor and an air side spacer surrounding the air side distributor, the fuel side spacer having a through hole therein in fluid communication with the air passage in the electrolyte and the air side spacer having a through hole therein in fluid communication with the fuel gas passage in the electrolyte.

15. The solid oxide fuel cell as claimed in claim 14, further comprising an interconnector between each of the cells, a bottom side of the interconnector completely covering an upper side of the fuel side distributor of a lower one of the cells and an upper side of the interconnector completely covering a bottom side of the air side distributor of an adjacent upper one of the cells, the interconnector including a fuel gas through hole and an air through hole, the fuel gas through hole being in fluid communication with the upper side of the fuel side distributor of the lower cell and in fluid communication with the through hole in the air side distributor of the upper cell, and the air through hole in the interconnector being in fluid communication with the bottom side of the air side distributor of the upper cell and in fluid communication with the through hole in the fuel side distributor of the lower cell.

16. The solid oxide fuel cell as claimed in claim 9, wherein an inner wall of each of the spacers faces an outer edge of a respective one of the electrodes and one end of each of the spacers is in contact with a surface of the electrolyte.

17. The solid oxide fuel cell as claimed in claim 1, further comprising air and fuel gas passage in the cells, the air passage extending through the cells such that air or an oxygen containing gas passes serially through the air side distributor of one of the cells and then through the air side distributor of an adjacent one of the cells, the fuel gas passage extending through the cells such that fuel gas passes easily through the fuel side distributor of one of the cells and then through the fuel side distributor of an adjacent one of the cells.

18. The solid oxide fuel cell as claimed in claim 1, wherein the cells are cylindrical in shape.

19. The solid oxide fuel cell as claimed in claim 3, wherein the first and second spacers are of insulating material.

20. The solid oxide fuel cell as claimed in claim 3, wherein each of the interconnectors has one side thereof in contact with the fuel side distributor of one of the cells and an opposite side thereof in contact with the air side distributor of an adjacent one of the cells.

* * * * *